United States Patent [19]

Asada

[11] Patent Number: 5,088,354
[45] Date of Patent: Feb. 18, 1992

[54] SHIFT CONTROL SYSTEM AND METHOD FOR AUTOMATIC TRANSMISSIONS

[75] Inventor: Toshiyuki Asada, Susono, Japan

[73] Assignee: Toyota Jidosha Kabushiki Kaisha, Toyota, Japan

[21] Appl. No.: 619,045

[22] Filed: Nov. 28, 1990

[30] Foreign Application Priority Data

Nov. 30, 1989 [JP] Japan .................................. 1-309027
Nov. 30, 1989 [JP] Japan .................................. 1-309029

[51] Int. Cl.⁵ ......................... F16H 1/46; F16H 59/14
[52] U.S. Cl. ..................................... 74/866; 475/276; 475/281
[58] Field of Search ............... 475/269, 271, 272, 275, 475/276, 281, 284, 288, 289, 290, 291, 296, 297, 329, 330; 74/867, 861, 866

[56] References Cited

U.S. PATENT DOCUMENTS

| 2,825,245 | 3/1958 | Hobbs | 475/278 |
|---|---|---|---|
| 3,043,163 | 7/1962 | Hobbs | 475/277 X |
| 3,115,793 | 12/1963 | Hobbs | 475/277 |
| 3,596,537 | 8/1971 | Koivunen | 192/85 AA X |
| 3,640,153 | 2/1972 | Kepner | 475/281 X |
| 3,678,785 | 7/1972 | Stahlberg | 475/281 |
| 3,848,518 | 11/1974 | Martin | 192/85 AA X |
| 3,863,524 | 2/1975 | Mon et al. | 475/281 X |
| 3,964,584 | 6/1976 | Bucksch | 192/87.1 |
| 4,225,026 | 9/1980 | Yamamori et al. | 192/85 AA |
| 4,233,861 | 11/1980 | Gaus et al. | 74/763 |
| 4,263,823 | 4/1981 | Numazawa et al. | 475/269 X |
| 4,395,925 | 8/1983 | Gaus | 475/284 X |
| 4,450,944 | 5/1984 | Fujioka | 192/85 AA X |
| 4,653,348 | 3/1987 | Hiraiwa | 475/276 |
| 4,660,439 | 4/1987 | Hiraiwa | 74/763 |
| 4,963,124 | 10/1990 | Takahashi et al. | 475/276 X |

FOREIGN PATENT DOCUMENTS

2108219 5/1983 United Kingdom .......... 152/85 AA

Primary Examiner—Leslie A. Braun
Assistant Examiner—Khoi Q. Ta
Attorney, Agent, or Firm—Oblon, Spivak, McClelland, Maier & Neustadt

[57] ABSTRACT

A shift control system and a system control method for use in an automatic transmission includes: an input shaft, an output shaft, a gear train including a plurality of revolving components and arranged between the input shaft and the output shaft, a plurality of clutches for connecting either the input shaft and any of the revolving components or the revolving components selectively, a plurality of brakes for stopping revolution of the revolving components selectively, and a one-way clutch belonging to any of the clutches and the brakes. Any of the speed stages is set according to at least two of a combination pattern of engagement/release of the clutches and brakes for engaging the one-way clutch and a combination pattern of engagement/release of clutches and brakes for releasing the one-way clutch. The combination patterns are always selected so as to switch the one way clutch.

24 Claims, 4 Drawing Sheets

SHIFT CONTROL SYSTEM AND METHOD FOR AUTOMATIC TRANSMISSIONS

BACKGROUND OF THE INVENTION

The present invention relates to a technology for controlling the shifts of an automatic transmission.

A vehicular automatic transmission generally uses a plurality of planetary gear sets, each of which is composed of revolving components such as a sun gear, a ring gear and a carrier. The automatic transmission is constructed by connecting predetermined ones of the revolving components, by connecting any of the revolving component selectively to an input shaft through clutch means, by fixing another revolving component selectively by brake means, and by connecting an output shaft to still another revolving component. In the automatic transmission thus constructed, the number of speed stages to be set, the gear ratios at the individual speed stages, and the number of revolution, loads or torques of the revolving components are varied in dependence upon the number of the planetary gear sets used, the manner how to connect the individual revolving components, and the number of and the manner how to dispose frictional engagement means such as the clutch means or the brake means, so that a remarkable variety of automatic transmissions can be constructed. All the structures could not be put into practical use, although they could be made in principle. It is not easy in the least to create a structure which can sufficiently meet the practical requirements such as feasible production, small size and low weight, ample shift controllability and excellent durability. For example, even an automatic transmission using three planetary gear sets to set five forward five and one reverse speed stages might have an excessively large gear ratio for the reverse stage in dependence upon the arrangement of the frictional engagement means such as the clutches and the gear ratio (i.e., the ratio of tooth numbers of the sun gears and the ring gears). For this automatic transmission, it would be necessary to increase the capacities of the frictional engagemetn means, thus raising a problem that the durabilities of the frictional engagement means and the bearings might be deteriorated. In order to solve this problem, as disclosed in Japanese Patent Laid-Open No. 60-57036, there is proposed an automatic transmission which is constructed to have a reverse gear ratio approximate to that for the forward 1st speed.

The structure of the automatic transmission according to this proposal will be briefly described in the following. This automatic transmission is composed mainly of three single pinion type planetary gear sets and is constructed by connecting the sun gear of the first planetary gear set and the sun gear of the second planetary gear set always or selectively, by connecting the sun gear of the first planetary gear set and the carrier of the second planetary gear set, if necessary, through a clutch, by connecting the ring gear of the second planetary gear set and the ring gear of the third planetary gear set, by connecting the carrier of the first planetary gear set with those ring gears, and by connecting the carrier of the second planetary gear set and the sun gear of the third planetary gear set through a clutch. The input shaft is connected through a clutch to the sun gears of the first and second planetary gear sets, which are connected to each other, and further to the ring gear of the first planetary gear set through another clutch. On the other hand, the output shaft is connected to the carrier of the third planetary gear set. As the brake means for stopping the revolutions, moreover, there are provided a brake for fixing the sun gear of the first planetary gear set and the sun gear of the second planetary gear set and a brake for fixing the sun gear of the third planetary gear set.

In Japanese Patent Laid-Open No. 60-57036, there is disclosed a structure in which a one-way clutch is arranged in parallel with the aforementioned clutches and brakes so as to facilitate the shift controls. In the automatic transmission disclosed in Japanese Patent Laid-Open No. 60-57036, moreover, the absolute values of the gear ratios for the forward 1st speed and reverse stages are so approximate that the automatic transmission can be small-sized while preventing any excessive torque from being applied to the revolving components at the speed stages of low frequencies of use.

Incidentally, it is preferable that the automatic transmission be as small and light as possible so as to have its mountability and fuel consumption improved as is well known in the art. For this purpose, it is desirable to reduce the sizes and number of the components. In the automatic transmission disclosed in Japanese Patnet Laid-Open No. 60-57036, however, the parts are small-sized by avoiding establishment of excessive torque, and a one-way clutch is provided for facilitating the shift controls. Since, however, each speed stage has only one kind of engagement/release pattern for the clutches and brakes to set that speed stage, it could be deduced that only one shift is provided for causing each one-way clutch to function its automatic changing characteristics. In order to provide an excellent controllability for any of the shifts, therefore, the automatic transmission is required to have additional one-way clutches. In short, the existing automatic transmission thus far described is disadvantageous in that its size is enlarged by the number of its necessary parts increased for improving the shift controllability. If the number of one-way clutches is reduced to avoid the disadvantage, the shift shocks might probably be increased to raise another problem that the shifts would become difficult to control.

SUMMARY OF THE INVENTION

An object of the present invention is to reduce the shift shocks and facilitate the shift control of an automatic transmission by making effective use of the fact that frictional engagement means for setting speed changes has plural kinds of combination patterns of engagement/release.

Another object of the present invention is to reduce the shift shocks and facilitate the shift control by increasing the frequencies of using a one-way clutch.

The shift control system and method according to the present invention are directed to an automatic transmission comprising: an input shaft, an output shaft, a gear train including a plurality of revolving components and arranged between said input shaft and said output shaft, a plurality of clutch means for connecting either said input shaft and any of said revolving components or said revolving components selectively, a plurality of brake means for stopping revolution of said revolving components selectively, and a one-way clutch belonging to any of said clutch means and said brake means. Any of speed stages is set according to at least two of a combination pattern of engagement/release of said clutch means and said brake means for engaging said one-way clutch and a combination pattern of engagement/release of said clutch means and said brake means for releasing said one-way clutch. The shift control system comprises speed stage decision means for determining a speed stage to be set, engagement/release pattern selection means for selecting the combination patterns of engagement/release of said clutch means and said brake means for switching said one-way clutch at the time of a shift from said one speed stage to another in case the speed stage to be set is said one speed stage, and output means for outputting both a command signal for setting the selected combination pattern of engagement/release of said clutch means and said brake means and a shift signal for executing the shift.

Moreover, the engagement/release pattern selection means of the shift control system of the present invention selects a combination pattern for executing a shift from said another speed stage to said one speed stage or vice versa by switching said one-way clutch, as the combination pattern of engagement/release of said clutch means and said brake means for setting said one speed stage.

Moreover, the gear train of the automatic transmission according to the present invention comprises, an input shaft, an output shaft, a first planetary gear set comprising a first sun gear, a first ring gear, a pinion gear meshing with said first sun gear and said first ring gear, and a first carrier supporting said pinion gear, a second planetary gear set comprising a second sun gear connected integrally or selectively to said first sun gear, a second ring gear, a pinion gear meshing with said second sun gear and said second ring gear, and a second carrier supporting said pinion gear, and a third planetary gear set comprising a third sun gear connected integrally or selectively to said second carrier, a third ring gear connected integrally or selectively to said first carrier, a pinion gear meshing with said third sun gear and said third ring gear, and a third carrier supporting said pinion gear and connected integrally or selectively to said second ring gear.

According to a shift control method of the present sent invention, on the other hand, as the combination pattern of engagement/release of said clutch means and said brake means for setting said one speed stage, there is selected a combination pattern of engagement/release of said clutch means and said brake means for switching said one-way clutch at the time of a shift between said one speed stage to another speed stage.

According to the shift control method of the present invention, moreover, as the combination pattern of engagement/release of said clutch means and said brake means for setting said one speed stage, there is selected a combination pattern for switching said one-way clutch to execute a shift from said another speed stage to said one speed stage or vice versa.

The above and further objects and novel features of the present invention will more fully appear from the following detailed description when the same is read in connection with the accompanying drawings. It is to be expressly understood, however, that the drawings are for the purpose of illustrations only and is not intended as a definition of the limits of the invention.

DETAILED DESCRIPTION OF THE PREFERRED EMBODIMENTS

Figure 1:
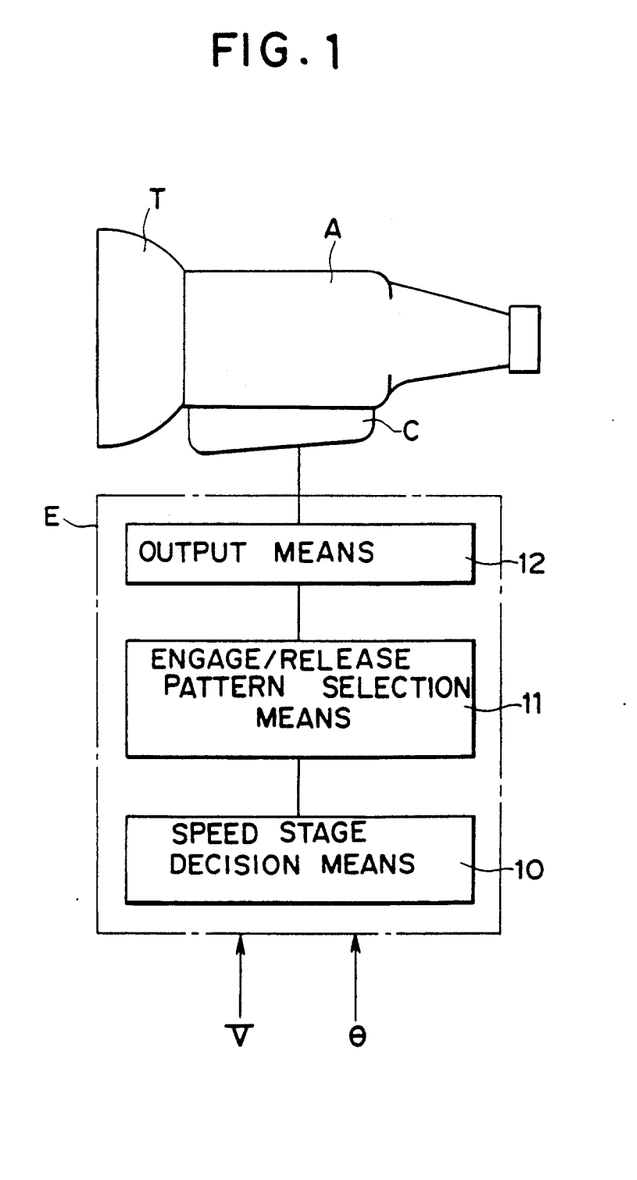
FIG. 1 is a block diagram showing the basic structure of one embodiment of the shift control system.

As shown in FIG. 1, an automatic transmission A is connected to the (not-shown) engine through a torque converter T and is equipped with gear sets and frictional engagement means, as will be described hereinafter. Moreover, the automatic transmission A is set to a plurality of speed stages by engaging or releasing the frictional engagement means with oil pressure to be outputted from hydraulic control means C.

This hydraulic control means C is equipped, for example, with a plurality of (not-shown) solenoid valves, which are to be turned on or off in response to a signal to be outputted from an electronic control unit E. This electronic control unit E is constructed mainly of a microcomputer which is fed with control data including a vehicle speed V and a throttle opening $\theta$.

This control unit E is composed of speed stage decision means 10, engagement/release pattern selection means 11 and output means 12.

The speed stage decision means 10 determines a speed stage to be set, on the basis of the vehicle speed V and the throttle opening $\theta$.

The engagement/release pattern selection means 11 selects a combination pattern (as will be shortly referred to as the "engagement/release pattern") of engagement/release of the frictional engagement means for setting a speed stage determined by the speed stage decision means 10. Moreover, the engagement/release pattern selection means 11 can select plural kinds of engagement/release patterns and selects the engagement/release pattern, according to which the one-way clutch is to be switched for executing a shift, for a speed stage at which the engagement/release pattern for engaging the one-way clutch and the engagement/release pattern for releasing the one-way clutch can be selected. On the other hand, the output means 12 outputs both a command signal for setting the engagement/release pattern selected and a shift signal for executing a shift to the hydraulic control means C.

The shift control system and method according to the present invention will be described more specifically in the following.

Figure 2:
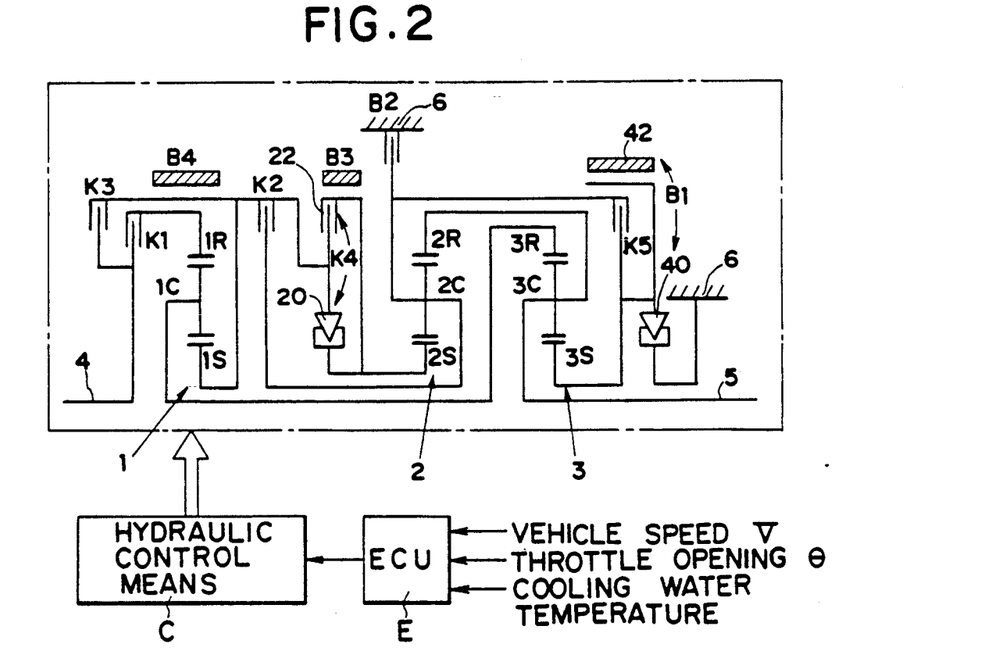
FIGS. 2 and 3 are skeleton diagrams showing more specified individual embodiments.

In FIG. 2, the gear train is constructed mainly of three single-pinion planetary gear sets 1, 2 and 3, the individual elements of which are connected, as follows. The carrier 1C of the first planetary gear set 1 and the ring gear 3R of the third planetary gear set 3 are so connected to each other that they can revolve together, and the ring gear 2R of the second planetary gear set 2 and the carrier 3C of the third planetary gear set 3 are so connected to each other that they can revolve together. Moreover, the sun gear 1S of the first planetary gear set 1 is connected to the carrier 2C of the second planetary gear set 2 through second clutch means K2 and further to the sun gear 2S of the second planetary gear set 2 through fourth clutch means K4. The carrier 2C of the second planetary gear set 2 in turn is connected to the sun gear 3S of the third planetary gear set 3 through the fifth clutch means K5.

Incidentally, the individual elements recited above can adopt such a connecting mechanism, e.g., a hollow shaft, a solid shaft or a suitable connecting drum as is currently used in the existing automatic transmission.

An input shaft 4 is connected do the (not-shown) engine through power transmission means such as a torque converter or a fluid coupling. Between this input shaft 4 and the ring gear 1R of the first planetary gear set 1, there is interposed first clutch means K1 for connecting the two selectively. Between the input shaft 4 and the sun gear 1S of the first planetary gear set 1, on the other hand, there is interposed third clutch means K3 for connecting the two selectively.

Of the aforementioned first to fifth clutch means K1 to K5, the fourth clutch means K4 is composed of a one-way clutch 20 and a multiple-disc clutch 22 in parallel relation to each other, and the remaining clutch means are composed of multiple-disc clutches.

Since the individual structural components are restricted in their arrangement for the practical applications, it is quite natural that suitable intermediate members such as the connecting drums can be interposed as the connecting members for the clutch means K1, K2, K3, K4 and K5.

As the brake means for stopping revolution of the revolving components of the planetary gear sets thus far described, on the other hand, there are provided: first brake means B1 for stopping revolution of the sun gear 3S of the third planetary gear set 3 selectively; second brake means B2 for stopping revolution of the carrier 2C of the second planetary gear set 2 selectively; third brake means B3 for stopping revolution of the sun gear 2S of the second planetary gear set 2 selectively; and fourth brake means B4 for stopping revolution of the sun gear 1S of the first planetary gear set 1 selectively. Of these brake means, the first brake means B1 is composed of: a one-way clutch 40 interposed between the sun gear 3S of the third planetary gear set 3 and a transmission casing (as will be shortly referred to as the "casing") 6: and a band brake 42 having a parallel relation to the one-way clutch 40. Moreover, the second brake means B2 is composed of a multiple-disc brake, and the third and fourth brake means B3 and B4 are composed of individual band brakes.

For practical uses, it is quite natural that suitable connecting members can be interposed between those brake means B1, B2, B3 and B4 and either the individual elements to be fixed by the brake means B1 to B4 or the casing 6.

Moreover, an output shaft 5 for transmitting the torque to the propeller shaft or the counter gear (although not shown individually) is connected to the ring gear 2R of the second planetary gear set 2 and the carrier 3C of the third planetary gear set 3, which in turn are connected to each other.

This automatic transmission, as shown in FIG. 2, is enabled in principle to set ten forward and one reverse speed stages: main forward five and reverse one speed stages; the so-called "2.2th, 2.5th and 2.7th speed stages" added between the forward 2nd and 3rd speed stages; and the so-called "3.2th and 3.5th speed stages" added between the forward 3rd and 4th speed stages.

At the speeds other than the 2.2th, 2.7th, 3.2th and 3.5th speeds, moreover, there are a plurality of sets of engagement/release combinations (i.e., the so-called "engagement/release patterns") of the clutch means and the brake means for setting those other speeds, as tabulated in the form of the clutch and brake application chart in Table 1.

TABLE 1

|  |  |  | Clutch Means | | | | | Brake Means | | | |
|---|---|---|---|---|---|---|---|---|---|---|---|
|  |  |  | K1 | K2 | K3 | K4 | K5 | B1 | B2 | B3 | B4 |
| 1st |  | ① | ○ |  |  | ○ | ○ | ○ | * |  |  |
|  |  | ② | ○ |  |  | ○ | ○ | * | ○ |  |  |
|  |  | ③ | ○ |  |  | * | ○ | ○ | ○ |  |  |
| 2nd | a | ① | ○ | ○ |  |  | ○ | ○ | * |  | * |
|  |  | ② | ○ | ○ |  |  | ○ | * | ○ |  | * |
|  |  | ③ | ○ | ○ |  |  | ○ | * | * |  | ○ |
|  |  | ④ | ○ | ○ |  |  | * | ○ | * |  | ○ |
|  |  | ⑤ | ○ | * |  |  | * | ○ | * |  | ○ |
|  |  | ⑥ | ○ | * |  |  | ○ | * | ○ |  | ○ |
|  | b | ① | ○ | ○ |  | ○ |  | ○ | ○ | ○ | * |
|  |  | ② | ○ | ○ |  | * |  | ○ | ○ | * | ○ |
| 2.2th |  |  | ○ | ○ |  |  | ○ |  | ○ |  |  |
| 2.5th |  | ① | ○ | ○ |  |  | ○ | ○ |  | ○ | * |
|  |  | ② | ○ | ○ |  |  | ○ | ○ |  | * | ○ |
|  |  | ③ | ○ | ○ |  | * |  | ○ |  | ○ | ○ |
| 2.7th |  |  | ○ | ○ |  | ○ |  | ○ |  |  |  |
| 3rd | a | ① | ○ |  | ○ |  | ○ | * | ○ | * |  |
|  |  | ② | ○ |  |  | ○ | ○ | * | ○ |  |  |
|  | b |  | ○ |  | ○ | ○ |  | ○ |  | * |  |
|  | c |  | ○ |  | ○ | * |  | ○ |  | ○ |  |
|  | d |  | ○ | * | ○ |  |  | ○ |  |  |  |
| 3.2th |  |  | ○ | ○ |  | ○ |  | ○ |  | ○ |  |
| 3.5th |  |  | ○ |  | ○ | ○ |  | ○ |  | ○ |  |
| 4th | a | ① | ○ | * | ○ | ○ | ○ | * |  |  |  |
|  |  | ② | ○ | ○ | ○ | * | ○ |  |  |  |  |
|  |  | ③ | ○ | ○ | * | ○ | ○ |  |  |  |  |
|  |  | ④ | ○ | * | ○ | ○ | ○ |  |  |  |  |
|  | b |  |  | ○ | ○ | ○ | ○ | * |  |  |  |
| 5th | a |  |  | ○ | ○ | ○ | * |  |  | ○ |  |
|  | b |  | * | ○ | ○ | ○ |  |  |  | ○ |  |
|  | c |  |  | ○ | ○ |  |  | * |  | ○ |  |
| Rev | a | ① |  |  |  | ○ | * | * | ○ |  |  |
|  |  | ② |  |  |  | ○ | ○ | ○ | * |  |  |
|  | b |  | * |  |  | ○ | ○ |  | ○ |  |  |

In Table 1: symbols ○ indicate that the elements are engaged; blanks indicate that the elements are released; and symbols * indicate that the elements may be engaged. In addition, these symbols * further indicate: that neither the gear ratio nor the revolving state is changed even if the elements such as the fifth clutch means K5 or the first brake means B1 at the 1st speed are released; that not the gear ratio but the revolving state is changed if the first brake means B1 is released, as in the pattern of the column b at the 4th speed; and that neither the gear ratio nor the revolving state is changed if the elements such as the fourth clutch means K4 or the third brake means B3 in the patterns in the column b at the 2nd speed are released with the other means indicated at the symbols * being engaged. Moreover, the columns, as designated at reference letters a, b, c, - - -, and so on at the 2nd, 3rd, 4th, 5th and reverse speeds, indicate such ones of the engagement/release patterns for setting the corresponding speed stages that the revolving elements of the planetary gear sets have different numbers of revolution. Still moreover, symbols ①, ②, ③, - - -, and so on designate the kinds of the engagement-/release patterns in which the revolving elements of the planetary gear sets do not have different numbers of revolution.

Table 1 enumerates the speed stages which can be set in principle. For the practical use, there is selected from those speed stages the speed stage which is superior in the power performance and the accelerating ability. Specifically, the speed stage having a gear ratio approximate to the geometric series is selected as a major one. As the engagement/release pattern for setting each of the speed stages, there is selected from those appearing in Table 1 the pattern which is advantageous in the shift controllability and the durability. These discussions will be specified for each of the forward speed stages. In this embodiment, the forward 1st speed is set according to the pattern ③ of Table 1, the 2nd speed is set according to the pattern ⑤ of the column a and the patterns ② and ① of the column b. The 3rd speed is set according to the pattern of the column b and the pattern of the column c; the 4th speed is set according to the pattern of the column a; and the 5th speed is set according to the pattern of the column a. These settings are enumerated in the form of a clutch and brake application chart in Table 2. Incidentally, symbols indicate that the corresponding elements are engaged at the time of engine braking.

TABLE 2

|  |  |  | Clutch Means | | | | | | Brake Means | | | | |
|---|---|---|---|---|---|---|---|---|---|---|---|---|---|
|  |  |  |  |  |  | K4 | | |  B1 | | | | |
|  |  |  | K1 | K2 | K3 | 22 | 20 | K5 | 42 | 40 | B2 | B3 | B4 |
| 1st |  | ③ | O |  |  | ※ |  | O | O | O | O |  |  |
| 2nd | a | ⑤ | O |  |  |  |  |  | ※ | O | O |  | O |
|  | b | ② | O |  |  | O |  |  | ※ | O |  | O | O |
|  |  | ① | O |  |  |  | ※ | O | O | O |  | O |  |
| 3rd | b |  |  |  | O | O |  |  | ※ | O |  | O |  |
|  | c |  |  | O | O | O |  |  | ※ | O |  |  |  |
| 4th |  | ④ | O |  | O | O | O |  |  |  |  |  |  |
|  | a |  | O | O | O | O | O |  |  |  |  |  |  |
|  |  | ① |  | O | O | ※ | O | O |  |  |  |  |  |
| 5th | a |  |  | O | O |  |  | O |  |  | O |  |  |

In this embodiment, as enumerated in Table 2, there are plural kinds of engagement/release patterns for setting the 2nd, 3rd and 4th speeds. These engagement/release patterns are determined according to the shift situations, i.e., in relation to the speed stage before or after the shift. First of all, the setting of the 2nd speed will be described in the following. In case the speed stage before the shift to the 2nd speed is the 1st speed and in case the shift to the 2nd speed is decided in that state, the pattern ⑤ of the column a is selected as the engagement/release pattern for setting the 2nd speed, and the shift command for setting the 2nd speed is outputted. Specifically, the 1st speed is set by engaging the one-way clutch 20 of the fourth clutch means K4, as the first clutch means K1, the band brake 42 and the one-way clutch 40 of the first brake means B1, and the second brake B2 are individually engaged. If, in this state, the fourth brake means B4 is engaged, the one-way clutch 20 of the fourth clutch means K4 is automated released to set the 2nd speed. In case, on the other hand, a shift from the 2nd speed to the 3rd speed is decided, the pattern ① of the column b is selected as the engagement/release pattern for setting the 2nd speed so that the shift command for setting the 3rd speed is outputted. After this, the shift command is outputted to set the 3rd speed according to the pattern of the column b. Specifically, the pattern ① of the column b for the 2nd speed is one for engaging the first clutch means K1, the one-way clutch 20 of the fourth clutch means K4, the band brake 42 and the one-way clutch 40 of the first brake means B1, and the third brake means B3. On the contrary, the pattern of the column b for the 3rd speed is one for engaging the third clutch means K3 and releasing the fourth clutch means K4. Thus, it is possible to effect the shift, in which the one-way clutch 20 of the fourth clutch means K4 functions. Incidentally, the pattern ⑤ of the column a and the pattern ① of the column b for the 2nd speed are highly different in the clutch means and brake means to be engaged. If, therefore, the 2nd speed is set according to either of the two patterns, there may arise a case, in which the number of frictional engagement means to be switched is increased although the shocks for the shift are not deteriorated. The steady state of the 2nd speed is preferably set according to the pattern ② of the column b, as seen from Table 2. In case the 1st speed is decided, the shift thereto is executed after the pattern has been changed into that ⑤ of the column a. In case the 3rd speed is decided, on the other hand, the shift thereto is executed after the pattern has been changed into that ① of the column b.

Next, the 3rd speed will be described in the following. In case of a shift from the 2nd speed, the 3rd speed is set according to the pattern of the column b, as has been described hereinbefore. In case a shift to the 4th speed is decided, on the other hand, this shift is set according to the pattern of the column c. Specifically, the first clutch means K1, the third clutch means K3, the multiple-disc clutch 22 of the fourth clutch means K4, and the one-way clutch 40 of the first brake means B1 are engaged. Since the 4th speed can be set by engaging any four clutch means, it can be achieved by causing the one-way clutch 40 of the first brake means B1 to function, because the one-way clutch 40 is automatically released in accordance with the engagement of the fifth clutch means K4 if the 3rd speed is set according to the pattern of the column c. Incidentally, the 3rd speed is set according to the pattern of the column b in case of the downshift to the 2nd speed and according to the pattern of the column c in case of the downshift from the 4th speed.

For a shift from the 3rd speed, the 4th speed is set according to the pattern ④ of the column a. This simplicity is allowed from the fact that the difference from the pattern of the column c of the 3rd speed is only at the engagement/release of the fifth clutch means K5 and the first brake means B1. For a shift from the 5th speed, on the other hand, the 4th speed is set according to the pattern ① of the column a. Specifically, this pattern ① of the column a is one for engaging the second clutch means K2, the third clutch means K3, the one-way clutch 20 of the fourth clutch means K4, and the fifth clutch means K5. On the contrary, the pattern of the column a of the 5th speed is one for engaging the second clutch means K2, the third clutch means K3, the fifth clutch means K5 and the third brake means B3. Therefore, the shifts between the 4th speed and the 5th speed can be executed by the switching control of the third brake means B3. Incidentally, the 4th speed can be set by engaging all the clutch means. Therefore, the steady state of the 4th speed follows the pattern, according to which all the clutch means are engaged, so that the pattern ④ or the pattern ① of the column a may be used for the shift to the 3rd speed or the 5th speed.

As has been described hereinbefore, a speed stage having plural kinds of engagement/release patterns is set according to different patterns depending upon the shift situations so that the one-way clutches can be caused to function effectively for the shift thereby to improve the shift shocks and facilitate the shift controls.

Each of the aforementioned individual speed stages is set in accordance with the engine load and the vehicle speed, as in the automatic transmission of the prior art. For these settings, there are provided: the hydraulic control means C for operating the aforementioned individual multiple-disc clutches and the multiple-disc brake; and the electronic control unit E for outputting a signal for executing the shift controls on the basis of the data such as the vehicle speed V, the throttle opening $\theta$ and the cooling water temperature. When the aforementioned shifts to be carried out, a signal for a shift from the 2nd speed to the 3rd speed, for example, is outputted, or the shift to the 3rd speed is decided. Then, the electronic control unit E outputs a signal at first for changing the engagement/release pattern for setting the 2nd speed into the pattern ① of the column b of Table 1. After this, the electronic control unit E outputs a signal for engaging the third clutch means K3, i.e., a signal for executing the shift to the 3rd speed so that the shift from the 2nd speed to the 3rd speed is carried out. For a shift either from the 3rd speed to the 4th speed or from the 4th speed to 5th speed, too, if the shift decision is carried out or if the shift signal is outputted, the signal for changing the engagement/release pattern is outputted at first so that the engagement/release pattern is changed, as has been described above, to execute the shift.

Although the description thus far made is directed to the case of upshifts, a downshift may be likewise effected by changing the engagement/release pattern for setting a predetermined speed stage into another once prior to, or simultaneously with the execution of the shift.

Figure 3:
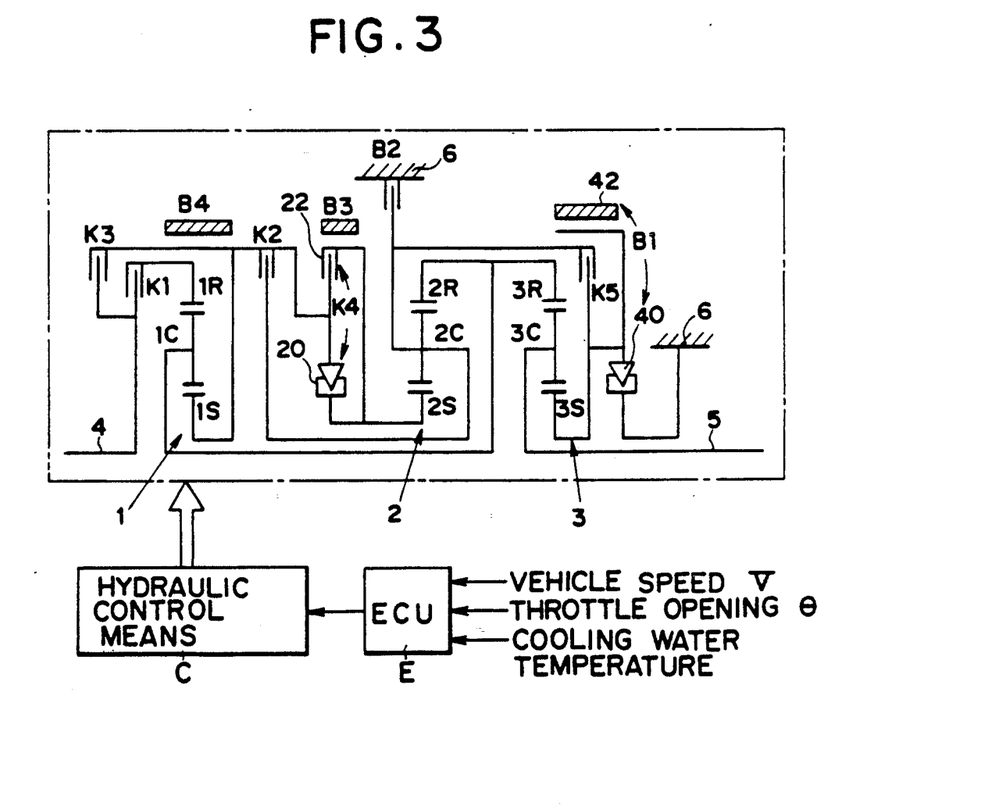

Another embodiment of the present invention is shown in FIG. 3. The structure disclosed herein is improved from the aforementioned one shown in FIG. 2. The difference from the structure of FIG. 2 resides in that the ring gear 2R of the second planetary gear set 2 is connected in place of the carrier 3C of the third planetary gear set 3 to the ring gear 3R of the third planetary gear set 3 so that the carrier 1C of the first planetary gear set 1 is connected to both of the ring gears 2R and 3R of the second and third planetary gear sets 2 and 3. The remaining structure is left unchanged from the structure shown in FIG. 2. The automatic transmission having the structure shown in FIG. 3 is enabled in principle to set forward ten speed stages—the 1st, 2nd, 2.2th, 2.5th, 3rd, 3.2th, 3.5th, 4th, 4.5th and 5th—and one reverse speed stage. Moreover, the automatic transmission has plural kinds of engagement/release patterns for setting a predetermined speed stage, as enumerated in Table 3:

TABLE 3

|  |  | Clutch Means | | | | | Brake Means | | | |
| --- | --- | --- | --- | --- | --- | --- | --- | --- | --- | --- |
|  |  | K1 | K2 | K3 | K4 | K5 | B1 | B2 | B3 | B4 |
| 1st |   | ① O |  |  | O | O | O | * |  |  |
|  |   | ② O |  |  | O | O | * | O |  |  |
|  |   | ③ O |  |  | O | * | O | O |  |  |
| 2nd | a | ① O | O |  | O |  | O | * |  | * |
|  |   | ② O | O |  | O |  | * | O |  | * |
|  |   | ③ O | O |  | O |  | * |  |  | O |
|  |   | ④ O | O |  | * |  | O | O |  | * |
|  |   | ⑤ O | * |  | O |  |  | O |  | O |
|  |   | ⑥ O | * |  |  |  | O |  |  | O |
|  | b | ① O |  |  |  | O | * |  | O | * |
|  |   | ② O |  |  |  | O |  | * | O | O |
| 2.2th |   |  | O |  | O |  |  | * |  | O |
| 2.5th |   | ① O |  |  |  | O | * |  |  | O |
|  |   | ② O |  |  |  | O |  | * |  | O |
|  |   | ③ O |  |  |  | * |  | O |  | O |
| 3rd | a | ① O | O | O |  |  | O | * |  |  |
|  |   | ② O | O | O |  |  | * | O |  |  |
|  | b | O | O |  | O |  | * |  | O |  |
|  | c | ① O | * | O | O |  | O |  | O |  |
|  |   | ② O | O | * | O |  | O |  | O |  |
|  |   | ③ O | * | O |  |  | O |  | O |  |
| 3.2th |   | O | O |  | O |  |  |  | O |  |
| 3.5th |   | O |  | O |  |  |  |  | O |  |

TABLE 3-continued

|  |  | Clutch Means | | | | | Brake Means | | | |
| --- | --- | --- | --- | --- | --- | --- | --- | --- | --- | --- |
|  |  | K1 | K2 | K3 | K4 | K5 | B1 | B2 | B3 | B4 |
| 4th |   | ① | O | O | O | * | O |  |  |  |
|  |   | ② | O | O |  | O | O |  |  |  |
|  |   | ③ | O | * |  | O | O |  |  |  |
|  |   | ④ | * |  | O | O | O |  |  |  |
| 4.5th |   |  |  |  | O | O |  | O |  | O |
| 5th |   |  |  |  | O | O |  |  |  | O |
| Rev | ① |  |  | O | O | O | O | * |  |  |
|  | ② |  |  | O | O | O | * | O |  |  |
|  | ③ |  |  | O | O | * | O | O |  |  |

Even in the structure shown in FIG. 3, like the foregoing embodiment, in case of an actual forward run, the speed is set to the 1st, 2nd, 3rd, 4th and 5th speeds, which have gear ratios approximate to the geometric species. Moreover, the engagement/release patterns for setting the individual speed stages are selected considering the shift controllability, and the reference for this selection and the change of the patterns are substantially identical to those of the embodiment shown in FIG. 2, as enumerated in the form of a clutch and brake application chart in Table 4:

TABLE 4

|  |  | Clutch Means | | | | | | | Brake Means | | | | |
| --- | --- | --- | --- | --- | --- | --- | --- | --- | --- | --- | --- | --- | --- |
|  |  |  |  |  | K4 | | |  | B1 | | | | |
|  |  | K1 | K2 | K3 | 22 | 20 | K5 | 42 | 40 | B2 | B3 | B4 |
| 1st |   | ③ | O |  |  | ※ |  | O | O | O | O |  |  |
| 2nd | a | ⑤ | O |  |  |  |  |  |  | ※ | O | O |  | O |
|  | b | ② | O |  |  | O |  | O |  | ※ | O |  | O | O |
|  |   | ① | O |  |  | ※ |  | O | O | O |  | O | O |
| 3rd | b |   | O |  | O | O | O |  |  | ※ | O | O |  |
|  | c |   | O | O | O | O |  |  |  |  |  | O |  |
| 4th |   | ① | O | O | O | O |  |  |  |  |  |  |  |
|  |   | ④ | O |  | O | O | ※ |  | O | O |  |  |  |
| 5th |   |  | O | O |  |  | O |  |  |  | O |  |  |

In this structure shown in FIG. 3, too, the shift from the 1st to 2nd speeds is carried out by releasing the one-way clutch 20 of the fourth clutch means K4 in accordance with the engagement of the fourth brake means means B4. At the 2nd speed, moreover, the engagement/release pattern is once changed into that ① of the column b of Table 3 prior to or simultaneously with the shift to the 3rd speed. After this, the third clutch means K3 is engaged, and the one-way clutch 20 of the fourth clutch means K4 is accordingly released to effect the shift to the 3rd speed. Incidentally, the steady state of the 2nd speed may be set according to the pattern ② of the column b like the foregoing embodiment.

On the other hand, the shift from the 3rd to 4th speeds is executed by changing the pattern for setting the 3rd speed from that of the column b to that of the column c, by engaging the fifth clutch means K5 in this state, and accordingly by releasing the one-way clutch 40 of the first brake means B1 automatically. Moreover, the shift from the 4th to 5th speeds is executed by once changing the pattern for setting the 4th speed from that ① to that ④, by engaging the third brake means B3 in this state, and accordingly by releasing the one-way clutch 20 of the fourth clutch means K4.

In case of a downshift, on the other hand, the shift is executed by changing the engagement/release patterns in the order reversed from the aforementioned one.

Moreover, these shift controls are executed like those of the embodiment of FIG. 2 by outputting a signal from the electronic control unit E on the basis of the input data, and by feeding or discharging the oil pressure from the hydraulic control means C to predetermined engagement means.

Thus, even the automatic transmission having the structure shown in FIG. 3 is constructed to set a predetermined speed stage in according with plural kinds of patterns according to the situations before and after the shift. Thus, the one-way clutches are enabled to effectively function for the shift thereby to improve the shift shocks and facilitate the shift controls.

Figure 4:
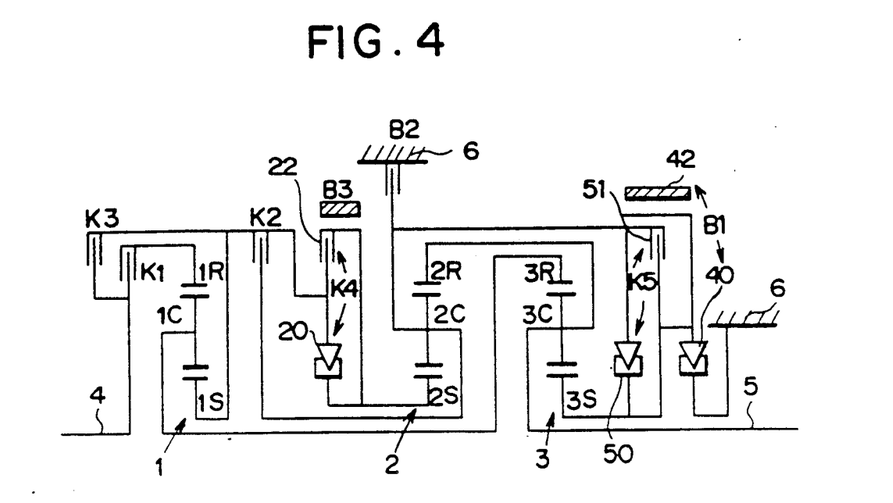
FIGS. 4 to 7 are skeleton diagrams showing other examples of the gear train.

Still another embodiment of the present invention is shown in FIG. 4. This embodiment is modified from the aforementioned structure of FIG. 2 in that the fourth brake means B4 is dispensed with and in that the fifth clutch means K5 is composed of a one-way clutch 50 and a multiple-disc clutch 51 in parallel relation to each other. The remaining structure is left unchanged from that shown in FIG. 2. The clutch and brake application chart for setting the main forward five speed stages is presented in Table 5:

TABLE 5

|  |  | Clutch Means | | | | | | Brake Means | | | |
|  |  | | | | K4 | | K5 | | B1 | | | |
|  |  | K1 | K2 | K3 | 22 | 20 | 51 | 50 | 42 | 40 | B2 | B3 |
| 1st |  | O |  |  | O | O |  | O | ※ | O | O |  |
|  |  | O |  |  | O | O | ※ | O | ※ | O |  |  |
| 2nd | b | O |  |  | ※ | O |  |  | O | O |  | O |
| 3rd | b | O |  | O |  |  |  |  | ※ | O |  | O |
|  | c | O |  | O | O |  |  |  | ※ | O |  |  |
| 4th | a | O | O | O | O |  |  |  |  |  |  |  |
|  |  |  | O | O | ※ |  | O | O |  |  |  |  |
| 5th | a |  | O | O |  |  |  | O |  |  |  | O |

Figure 5:
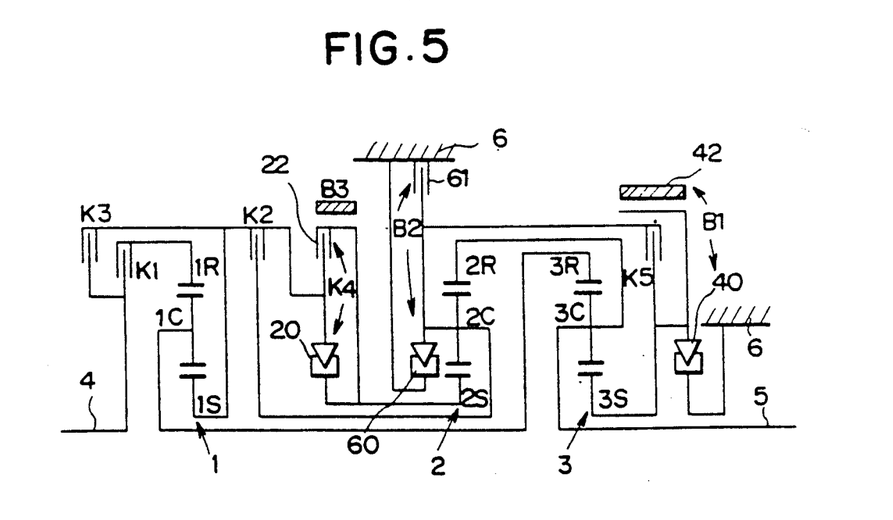

Another embodiment shown in FIG. 5 is modified from the structure of FIG. 2 in that the fourth clutch means K4 is dispensed with and in that the second brake means B2 is composed of a one-way clutch 60 and a multiple-disc clutch 61 in parallel relation to each other. The remaining structure is left unchanged from that shown in FIG. 2. The clutch and brake application for setting the main forward five speed stages is presented in Table 6:

TABLE 6

|  |  | Clutch Means | | | | | | Brake Means | | | |
|  |  | | | | K4 | | | B1 | | B2 | | |
|  |  | K1 | K2 | K3 | 22 | 20 | K5 | 42 | 40 | 61 | 60 | B3 |
| 1st |  | O |  |  | O | O |  | O | O | ※ | O |  |
| 2nd | b | O |  |  | ※ | O |  | O | O |  |  | O |
| 3rd | b | O |  | O |  |  |  | ※ | O |  |  | O |
|  | c | O |  | O | O |  |  | ※ | O |  |  |  |
| 4th | a | O | O | O | O |  |  |  |  |  |  |  |
|  |  | O | O | ※ |  | O |  |  |  |  |  |  |
| 5th | a | O | O |  |  | O |  |  |  |  |  | O |

Figure 6:
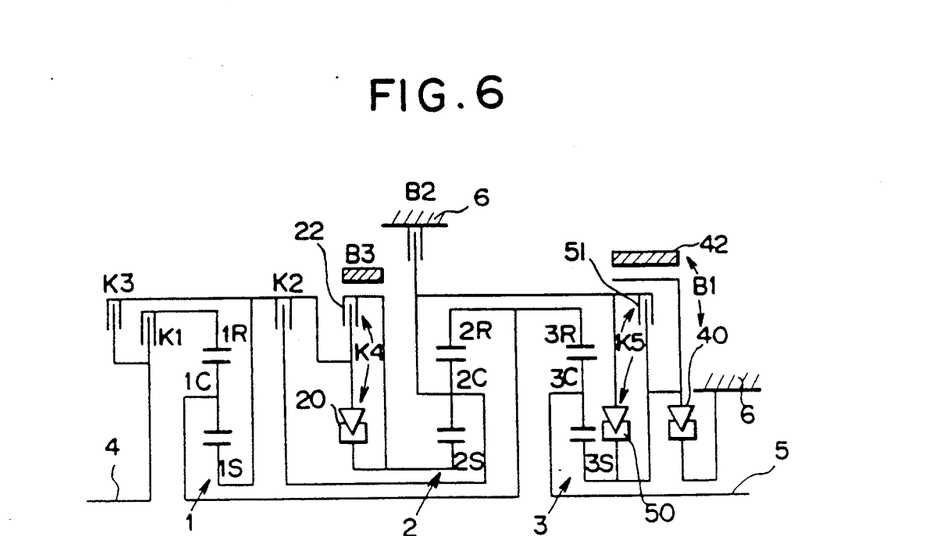

A further embodiment shown in FIG. 6 is modified from the aforementioned structure of FIG. 3 in that the fourth brake means B4 is dispensed with and in that the fifth clutch means K5 is composed of a one-way clutch 50 and a multiple-disc clutch 51 in parallel relation to each other. The remaining structure left unchanged from that shown in FIG. 3. The clutch and brake application chart for setting the main forward five speed stages is presented in Table 7:

TABLE 7

|  |  | Clutch Means | | | | | | Brake Means | | | |
|  |  | | | | K4 | | K5 | | B1 | | | |
|  |  | K1 | K2 | K3 | 22 | 20 | 51 | 50 | 42 | 40 | B2 | B3 |
| 1st |  | O |  |  | O | O | ※ | O | ※ | O | O |  |
| 2nd | b | O |  |  | O | O | ※ | O | ※ | O |  |  |
| 3rd | b | O |  |  | ※ | O |  |  | O | O |  | O |
|  | c | O |  | O |  |  |  |  | ※ | O |  | O |
| 4th |  | O | O | O | O |  |  | O |  ※ | O |  |  |
|  |  |  | O | O | ※ |  | O |  |  |  |  |  |
| 5th |  |  | O | O |  |  |  | O |  |  |  | O |

Figure 7:
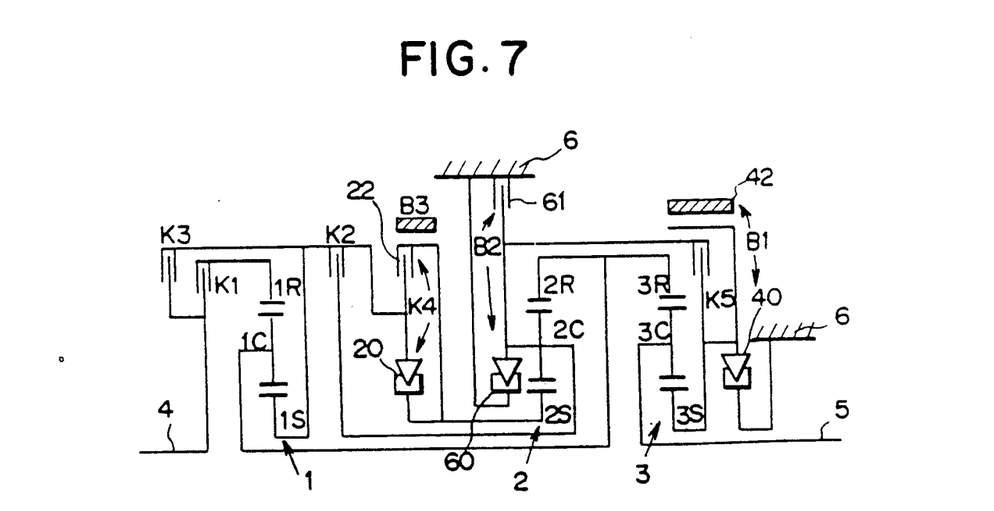

A further embodiment shown in FIG. 7 is modified from the structure of FIG. 3 in that the fourth clutch means K4 is dispensed with and in that the second brake means B2 is composed of a one-way clutch 60 and a multiple-disc clutch 61 in parallel relation to each other. The remaining structure is left unchanged from that shown in FIG. 3. The clutch and brake application for setting the main forward five speed stages is presented in Table 8:

TABLE 8

|  |  | Clutch Means | | | | | | Brake Means | | | |
|  |  | | | | K4 | | | B1 | | B2 | | |
|  |  | K1 | K2 | K3 | 22 | 20 | K5 | 42 | 40 | 61 | 60 | B3 |
| 1st |  | O |  |  | O | O |  | O | O | ※ | O |  |
| 2nd | b | O |  |  | ※ | O |  | O | O |  |  | O |
| 3rd | b | O |  | O |  |  |  | ※ | O |  |  | O |
|  | c | O |  | O | O |  |  | ※ | O |  |  |  |
| 4th |  | O | O | O | O |  | O |  |  |  |  |  |
|  |  | O | O | ※ | O | O |  |  |  |  |  |  |
| 5th |  | O | O |  | O |  |  |  |  |  |  | O |

The automatic transmission having any of the structures shown in FIGS. 4 to 7 is given, as is apparent from their individual clutch and brake application charts, the plural kinds of engagement/release patterns for each of the forward 3rd and 4th speeds. By setting these speed stages according to the engagement/release patterns enumerated in the corresponding ones of Tables, the one-way clutch 20 or 40 of the fourth clutch means K4 or the first brake means B1 is enabled to effectively function thereby to improve the shift shocks and facilitate the shift controls.

Here, the present invention should not be limited to the automatic transmission equipped with the aforementioned gear trains shown in FIGS. 2 to 7 but can also be applied to an automatic transmission equipped with a gear train having a double-pinion planetary gear set or a Ravignaux type planetary gear set. Moreover, the frictional engagement means including the one-way clutch should not be limited to those of the aforementioned individual embodiments but can be exemplified by suitable ones in accordance with the structure of a gear train. Still moreover, the frictional engagement means other than the one-way clutch should not be limited to neither the aforementioned multiple-disc clutch, multiple-disc brake or band brake, but a variety of frictional engagement means, if necessary, may be used of itself or in combination.

The merits to be obtained from the shift control system or method according to the present invention will be summarized in the following. Since a one-way clutch is switched for operations at the time of various shifts in accordance with the present invention, the shift shocks can be reduced, and the shift controls can be facilitated.

At the same time, the automatic transmission can be small-sized.

What is claimed is:

1. In an automatic transmission comprising: an input shaft; an output shaft; a gear train including a plurality of revolving components and arranged between said input shaft and said output shaft; a plurality of clutch means for connecting either said input shaft and any of said revolving components or said revolving components selectively; a plurality of brake means for stopping revolution of said revolving components selectively; and a one-way clutch belonging to at least one speed stage, is set according to at least two combination patterns, one of said combination patterns being a combination pattern of engagement/release of said clutch means and said brake means for engaging said one-way clutch and an other of said combination patterns being a combination pattern of engagement/release of said clutch means and said brake means for releasing said one-way clutch, a shift control system comprising: speed stage decision means for determining a speed stage to be set; engagement/release pattern selection means for selecting the combination patterns of engagement/release of said clutch means and said brake means for switching said one-way clutch at the time of a shift between said one speed stage to another when the speed stage to be set is said one speed stage; and output means for outputting both a command signal for setting the selected combination pattern of engagement/release of said clutch means and said brake means and a shift signal for executing the shift.

2. A shift control system according to claim 1, wherein the engagement/release pattern selection means selects a combination pattern for switching said one-way clutch at the time of a shift from said another speed stage to said one speed stage.

3. A shift control system according to claim 1, wherein the engagement/release pattern selection means selects a combination pattern for switching said one-way clutch at the time of a shift from said one speed stage to still another speed stage.

4. A shift control system according to claim 1, wherein the engagement/release pattern selection means selects a combination pattern for switching said one-way clutch, at the time of a shift from said another speed stage to said one speed stage, as the combination pattern of engagement/release of said clutch means and said brake means for setting said one speed stage, and then selects the other combination pattern of engagement/release of said clutch means and said brake means, after said one speed stage has been set.

5. A shift control system according to claim 4, wherein the other combination pattern of engagement/release of said clutch means and said brake means is one for achieving the shift from said one speed stage to said still another speed stage by switching said one-way clutch.

6. A shift control system according to claim 5, wherein said engagement/release pattern selection means selects still another combination pattern of said clutch means and said brake means prior to selection of said other combination pattern of engagement/release of said clutch means and said brake means.

7. A shift control system according to claim 5, wherein said output means outputs a command signal for setting said other combination pattern of said clutch means and said brake means immediately before it outputs a shift signal for executing the shift from said one speed state to said still another speed stage.

8. A shift control system according to claim 1, wherein said gear train comprises:

a first planetary gear set comprising a first sun gear, a first ring gear, a pinion gear meshing with said first sun gear and said first ring gear, and a first carrier supporting said pinion gear;

a second planetary gear set comprising a second sun gear connected to said first sun gear, a second ring gear, a pinion gear meshing with said second sun gear and said second ring gear, and a second carrier supporting said pinion gear; and a third planetary gear set comprising a third sun gear connected to said second carrier, a third ring gear connected to said first carrier, a pinion gear meshing with said third sun gear and said third ring gear, and a third carrier supporting said pinion gear and connected to said second ring gear.

9. A shift control system according to claim 8, wherein said gear train comprises:

first clutch means for connecting said input shaft and said first ring gear selectively;

second clutch means for connecting said first sun gear and said second carrier selectively;

third clutch means for connecting said input shaft and said first sun gear selectively;

fourth clutch means for connecting said second first sun gear and said sun gear selectively;

first brake means for stopping revolution of said second carrier selectively; and second brake means for stopping revolution of said second sun gear selectively, and wherein said output shaft is connected to said third carrier.

10. A shift control system according to claim 9, wherein the fourth clutch means of said gear train comprises a multiple-disc clutch and a one-way clutch arranged in parallel relation to said multiple-disc clutch.

11. A shift control system according to claim 10, wherein said brake means is a band brake.

12. A shift control system according to claim 9, wherein said first brake means comprises a multiple-disc brake and a one-way clutch arranged in parallel relation to said multiple-disc brake.

13. A shift control system according to claim 1, wherein said gear train comprises:

a first planetary gear set comprising a first sun gear, a first ring gear, a pinion gear meshing with said first sun gear and said first ring gear, and a first carrier supporting said pinion gear;

a second planetary gear set comprising a second sun gear connected to said first sun gear, a second ring gear connected to said first carrier, a pinion gear meshing with said second sun gear and said second ring gear, and a second carrier supporting said pinion gear; and a third planetary gear set comprising a third sun gear connected to said second carrier, a third ring gear connected to said first carrier, a pinion gear meshing with said third sun gear and said third ring gear, and a third carrier supporting said pinion gear.

14. A shift control system according to claim 13, wherein said gear train comprises:

first clutch means for connecting said input shaft and said first ring gear selectively;

third clutch means for connecting said input shaft and said first sun gear selectively;

fifth clutch means for connecting said second carrier and said third sun gear selectively;

second brake means for stopping revolution of said second sun gear selectively; and third brake means for stopping revolution of said third sun gear, and wherein said output shaft is connected to said third carrier.

15. A shift control system according to claim 14, wherein said gear train further comprises first brake means for stopping revolution of said second carrier selectively.

16. A shift control system according to claim 14, wherein said gear train further comprises:

second clutch means for connecting said first sun gear and said second carrier selectively; and fourth clutch means for connecting said first second sun gear and said second carrier selectively.

17. A shift control system according to claim 16, wherein said gear train further comprises fourth brake means for stopping revolution of said first sun gear selectively.

18. In an automatic transmission comprising: an input shaft; an output shaft; a gear train including a plurality of revolving components and arranged between said input shaft and said output shaft; a plurality of clutch means for connecting either said input shaft and any of said revolving components or said revolving components selectively; a plurality of brake means for stopping revolution of said revolving components selectively; and a one-way clutch belonging to at least one speed stage is set according to at least two combination patterns, one of said combination patterns being a combination pattern of engagement/release of said clutch means and said brake means for engaging said one-way clutch and an other of said combination patterns being a combination pattern of engagement/release of said clutch means and said brake means for releasing said one-way clutch, a shift control method wherein a combination pattern of engagement/release of said clutch means and said brake means for switching said one-way clutch is selected, as the combination pattern of engagement/release of said clutch means and said brake means for setting said one speed stage, at the time of a shift between said one speed stage and another speed stage.

19. A shift control method according to claim 18, wherein a combination pattern, according to which a shift from said another speed stage to said one speed stage is to be executed by switching said one-way clutch, is selected as the combination pattern of engagement/release of said clutch means and said brake means for setting said one speed stage.

20. A shift control method according to claim 18, wherein a combination pattern for switching said one-way clutch at the time of a shift from said one speed stage to still another speed stage is selected, at the time of a shift from said one speed state to still another speed stage, as the combination pattern of engagement/release of said clutch means and said brake means for setting said one speed stage.

21. A shift control method according to claim 18, wherein a combination pattern for switching said one-way clutch at the time of a shift from said another speed stage to said one speed stage is selected as the combination pattern of engagement/release of said clutch means and said brake means for setting said one speed stage, and the other combination pattern of engagement/release of said clutch means and said brake means is selected after said one speed stage has been set.

22. A shift control method according to claim 21, wherein the other combination pattern of engagement/release of said clutch means and said brake means is one for achieving the shift from said one speed stage to said still another speed stage by switching said one-way clutch.

23. A shift control method according to claim 22, wherein still another combination pattern of said clutch means and said brake means is selected, prior to selection of said other combination pattern of engagement/release of said clutch means and said brake means, as the combination pattern of engagement/release of said clutch means and said brake means.

24. A shift control method according to claim 22, wherein a command signal for setting said other combination pattern of said clutch means and said brake means as the combination pattern of engagement/release of said clutch means and said brake means for setting said one speed stage immediately before a shift signal for executing the shift from said one speed state to said still another speed stage is outputted.

* * * * *

UNITED STATES PATENT AND TRADEMARK OFFICE
CERTIFICATE OF CORRECTION

PATENT NO. : 5,088,354
DATED : 02/18/92
INVENTOR(S) : TOSHIYUKI ASADA

It is certified that error appears in the above-identified patent and that said Letters Patent is hereby corrected as shown below:

Column 14, line 29, delete "second".

Column 14, line 30, after "said" insert --second--.

Column 15, line 19, delete "first".

Column 15, line 33, after "to" insert --any of said clutch means and said brake means, wherein--.

Signed and Sealed this

Twenty-fifth Day of May, 1993

Attest:

MICHAEL K. KIRK

Attesting Officer

Acting Commissioner of Patents and Trademarks